Figure 1:
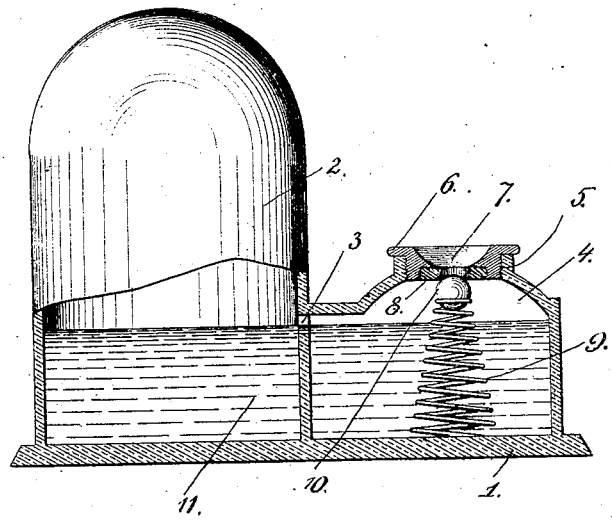

No. 854,542. PATENTED MAY 21, 1907.
L. D. ST. CLAIR.
INK WELL.
APPLICATION FILED FEB. 18, 1907.

WITNESSES:
A. H. Rabsag,
R. N. Butler

INVENTOR
Loyd D. St Clair,
BY H. C. Evert & Co.
Attorneys

UNITED STATES PATENT OFFICE.

LOYD D. ST. CLAIR, OF VANVOORHIS, WEST VIRGINIA.

INK-WELL.

No. 854,542.     Specification of Letters Patent.     Patented May 21, 1907.

Application filed February 18, 1907. Serial No. 357,912.

*To all whom it may concern:*

Be it known that I, LOYD D. ST. CLAIR, a citizen of the United States of America, residing at Vanvoorhis, in the county of Monongalia and State of West Virginia, have invented certain new and useful Improvements in Ink-Wells, of which the following is a specification, reference being had therein to the accompanying drawing.

This invention relates to ink wells, and the invention has for its object the provision of novel means in connection with an ink well to prevent the contents thereof from being spilled when the ink well is accidentally upset or tilted.

Another object of this invention is to provide novel means in connection with an ink well for preventing the contents thereof from evaporating when the well is not being used.

A further object of this invention is to provide a simple, durable and inexpensive ink well, the interior of which can be easily observed to determine the quantity of writing fluid contained therein.

With the above and other objects in view which will more readily appear as the invention is better understood, the same consists in the novel construction, combination and arrangement of parts to be hereinafter more fully described and then specifically pointed out in the appended claim.

Referring to the drawing forming part of this specification, like numerals of reference designate corresponding parts throughout the several views, in which:—

Figure 2:
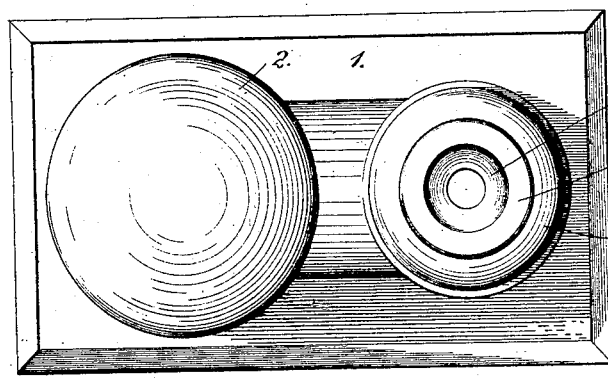
Figure 3:
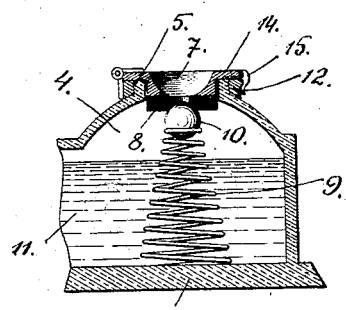

Figure 1 is a vertical sectional view of my improved ink well partly in elevation, Fig. 2 is a plan of the same, Fig. 3 is a vertical sectional view of a portion of the ink well illustrating a modified form of construction.

To put my invention into practice, I construct my improved ink well of a vitreous material such as glass, the ink well consisting of a base 1 having a dome-like receptacle 2 communicating by an opening 3 with a receptacle or dip well 4, said receptacle or dip well having a contracted interiorly threaded neck 5 to receive a lid or cover 6. The lid or cover is provided with a funnel-shaped opening 7 and with a resilient gasket 8, said gasket forming the lower part of said opening. Normally held in engagement with the gasket 8 by a coiled spring 9 is a spherical body or ball valve 10, said spherical body or ball valve normally engaging said gasket and preventing the writing fluid or contents 11 of said ink well from escaping or evaporating.

In Fig. 3 of the drawings, I have illustrated a slight modification of my invention, wherein the threads of the lid or cover 6 are dispensed with and the contracted neck portion 5 of the receptacle or dip well 4 provided with a collar 12 carrying a hinged lid 14 similar to the lid 6, said lid 14 being normally held in engagement with the collar 12 by a spring clasp 15.

To fill my improved ink well with a writing fluid the lid or cover 6 is removed and the writing fluid poured into the receptacle or dip well 4, from where it passes through the opening 3 into the dome-like receptacle 2. After the dip well has been filled, the lid or cover 6 is replaced normally holding the coiled spring 9 under tension, whereby the spherical body or ball valve 10 will be held in engagement with the gasket 8. When a pen or similar writing instrument is introduced into the dip well the spherical body or ball 10 is depressed until the pen point has become immersed in the contents of the dip well. After the writing fluid or contents of the dip well has been lowered beneath the opening 3 the writing fluid or contents of the dome-like receptacle 2 can be transferred to the dip well by slightly tilting the ink well. In this manner a certain quantity or depth of writing fluid can be retained in the receptacle 4 independent of the contents of the dome-like receptacle 2.

I do not care to confine myself to the material from which the ink well is constructed, nor to the minor details of construction entering into the same. Such other changes in the size, and proportion of the ink well as are permissible by the appended claim, may be resorted to without departing from the spirit and scope of the invention.

What I claim and desire to secure by Letters Patent, is:—

In an ink well, a base, a receptacle mounted on said base adjacent one end thereof, a dip well mounted on the base adjacent the other end thereof, a partition separating said receptacle and dip well having an opening in its upper edge establishing communication between the receptacle and the dip well, a cover or lid for said dip well, having a central opening, a gasket seated in the underneath face of said cover or lid, a coiled spring resting on the base beneath said lid, and a ball valve carried in the upper end of said spring normally seating against said gasket.

In testimony whereof I affix my signature in the presence of two witnesses:

LOYD D. ST. CLAIR.

Witnesses:
C. L. EVERLY,
JOHN F. ROSS.